R. B. NAYLOR.
TESTING DEVICE FOR DETERMINING THE VISCOSITY OF RUBBER.
APPLICATION FILED FEB. 5, 1919.

1,327,838.

Patented Jan. 13, 1920.

INVENTOR.
Ralph B. Naylor
BY Chapin + Neal
ATTORNEYS.

UNITED STATES PATENT OFFICE.

RALPH B. NAYLOR, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

TESTING DEVICE FOR DETERMINING THE VISCOSITY OF RUBBER.

1,327,838.

Specification of Letters Patent. Patented Jan. 13, 1920.

Application filed February 5, 1919. Serial No. 275,154.

*To all whom it may concern:*

Be it known that I, RALPH B. NAYLOR, a citizen of the United States of America, residing at Springfield, in the county of Hampden and State of Massachusetts, have invented certain new and useful Improvements in Testing Devices for Determining the Viscosity of Rubber, of which the following is a specification.

The present invention relates to a testing device for determining the viscosity of rubber, and has for its object the provision of a mechanism for determining the viscosity under varying conditions of temperature and pressure.

Referring to the drawings.

Figures 1, 2:
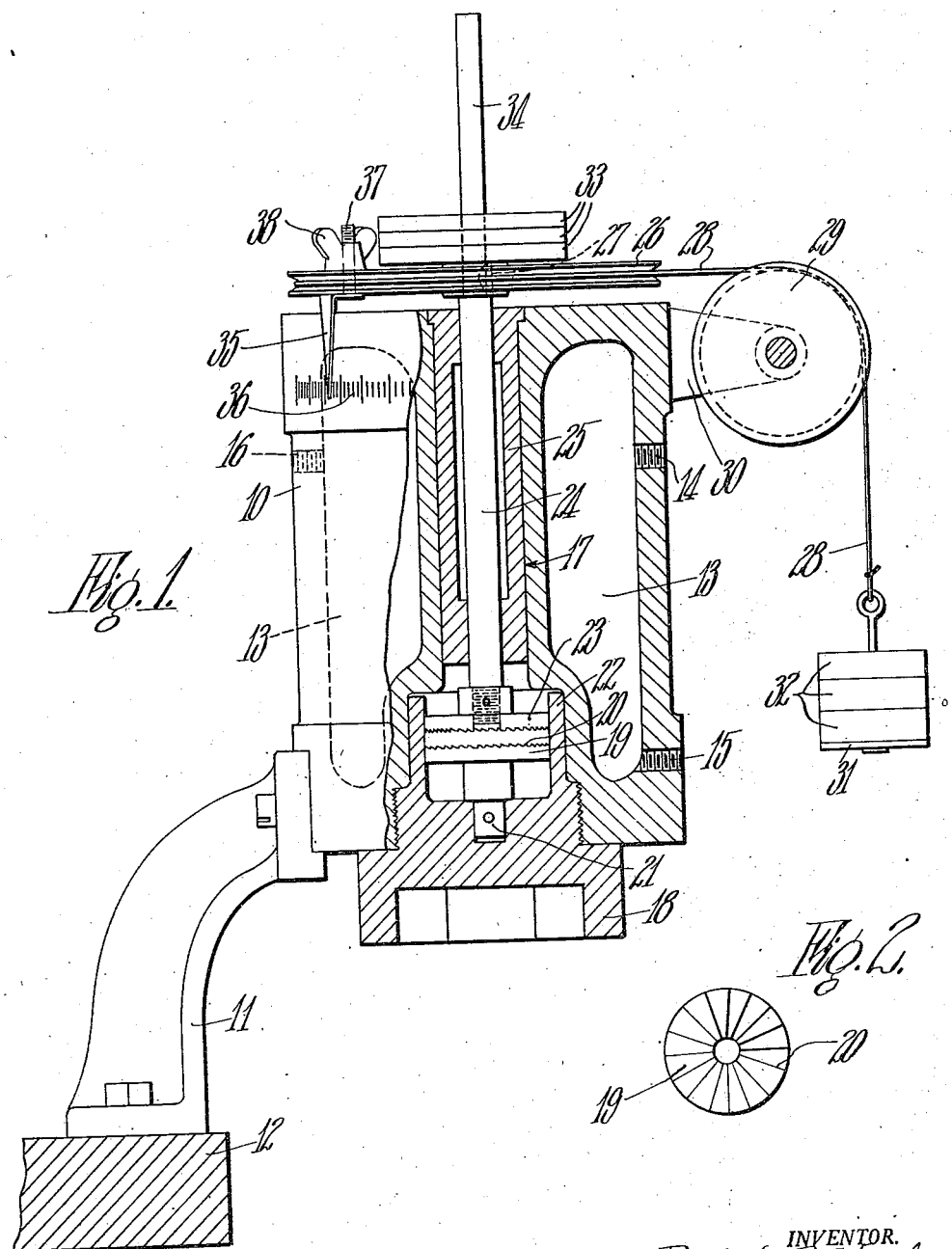
Figure 1 is a side elevation of the device, partly in section.
Fig. 2 is a plan view of the lower gripping member.

A cylinder 10 is secured by means of a bracket 11 to table 12. The cylinder is cored out as at 13 and provision is made for the circulation of steam or other heating medium by tapped holes 14 and 15, or the cylinder may be heated in any other well known way, as by electrical resistance coils. To keep track of the temperature at all times a thermometer may be inserted at 16.

A hole 17 runs axially through the cylinder, and is widened at its lower end for the reception of a nut 18, which screws into place. This nut carries, fastened to it against rotation, a lower gripping member 19, having radial teeth 20 on the upper side of the nut. The nut has upwardly extending walls 22 forming a chamber in which the lower gripping member 19 and the upper gripping member 23 fit. The upper gripping member has on its lower surface radial teeth similar to the teeth 20 on the lower gripping member, and moves freely in the chamber formed by walls 22, being fastened to the lower end of a shaft 24 mounted in a bushing 25 secured in hole 17 of the cylinder.

Directly above the cylinder is a grooved pulley 26, which is keyed at 27 to shaft 24. A cord 28 is fastened to the pulley 26 and, after passing around the latter, runs over a second pulley 29 mounted on a bracket 30 on the side of the cylinder. To the end of cord 28 is attached a plate 31, on which may be placed different weights 32, which may be changed to produce any desired torsion on shaft 24 through the medium of cord 28 and pulley 26. Another set of weights 33 may be placed over an extension 34 of shaft 24, and rest on pulley 26, thereby giving control over the pressure with which the upper gripping member is forced downwardly. To indicate the amount of rotation of the upper gripping member relative to the lower member a pointer 35 is attached to the pulley 26 and runs over a scale 36 on the side of cylinder 10. To facilitate reading of the scale by allowing a zero setting of the pointer before each reading, the pointer is secured to a bolt 37 passing through an arcuate slot in the pulley 26. The pointer may be clamped in any desired position by a thumb nut 38.

In testing the viscosity of rubber with my device nut 18 is removed, a test piece of rubber is laid on top of the lower gripping member and the nut screwed back into place. Steam is admitted to chamber 13 until the rubber has had an opportunity to be uniformly heated to the desired temperature. Weights 32 and 33 are then placed in position. The travel of pointer 35 during a definite period of time is noted and serves as the basis for the comparison of various rubber stocks.

Stocks of a certain grade should show a definite travel for known conditions of pressure, torsion, temperature and time, and, these being known for standard stocks, a comparison of samples is easy. It will be understood that the lower face of the test piece of rubber laid on gripping member 19 is held by this stationary gripping member while the movable gripping member 23 causes a movement of the rubber proportioned to its viscosity under the conditions of the test. It is the viscosity of the rubber which permits the larger part of the movement indicated on the scale.

A further use of this device is in the direct determination of the coefficient of viscosity. A calibration chart can be prepared, showing the coefficient of viscosity corresponding to different amounts of travel of the pointer in a unit time for different conditions of pressure, torsion and temperature, and, those conditions being known and the travel of the pointer determined, the coefficient of viscosity for the sample in hand may be read directly from the chart.

Having thus described my invention, I claim:

1. In a testing device of the class described, opposing gripping members for holding a test piece of rubber, and adapted for relative rotation about an axis perpendicular to the general plane of their gripping surfaces, means for causing a known pressure between the members, means for causing a known torsion between the members, and means for indicating the resulting amount of relative rotation between the members.

2. In a testing device of the class described, opposing gripping members for holding a test piece of rubber, and adapted for relative rotation about an axis perpendicular to the general plane of their gripping surfaces, means for causing a known pressure between the members, means for causing a known torsion between the members, means for indicating the resulting amount of relative rotation between the members, and means for heating the test piece.

3. In a testing device of the class described, opposing gripping members for holding a test piece of rubber, and adapted for relative rotation about an axis perpendicular to the general plane of their gripping surfaces, means whereby varying degrees of torsion may be exerted between the members, and means for indicating the resulting amount of relative rotation between the members.

4. In a testing device of the class described, opposing gripping members for holding a test piece of rubber, and adapted for relative rotation about an axis perpendicular to the general plane of their gripping surfaces, means whereby varying degrees of torsion may be exerted between the members, means for indicating the resulting amount of relative rotation between the members, and means for heating the test piece.

5. In a testing device of the class described, a stationary gripping member, a shaft in axial alinement with said gripping member, a second gripping member secured to the shaft, means whereby the pressure between the two gripping members may be regulated and held constant, means for rotating the shaft with a known torsion, and means for applying heat to a test piece of rubber held between the gripping members.

6. In a testing device of the class described; a stationary gripping member; a shaft in axial alinement with said gripping member, said shaft being constructed and arranged for the reception of weights, whereby the shaft may be forced with regulable and known pressure toward said gripping member; a second gripping member fast to the shaft; and a pulley on the shaft, and regulable weight means connected to the pulley, whereby the shaft may be impelled to rotate with a regulable and known torsion.

RALPH B. NAYLOR.